United States Patent [19]
Scherenberg et al.

[11] 3,861,282
[45] Jan. 21, 1975

[54] HEATING AND VENTILATING INSTALLATION FOR A MOTOR VEHICLE

[75] Inventors: Hans O. Scherenberg, Stuttgart; Rudolf Andres, Sindelfingen, both of Germany

[73] Assignee: Daimler-Benz Aktiengesellschaft, Stuttgart, Germany

[22] Filed: Apr. 10, 1974

[21] Appl. No.: 459,798

[30] Foreign Application Priority Data
Apr. 11, 1973 Germany.......................... 2318175

[52] U.S. Cl................................ 98/14, 98/13, 98/2, 98/2.01, 98/101, 62/133
[51] Int. Cl....................................................... B60l
[58] Field of Search.............. 98/13, 14, 2, 2.01, 10; 62/133

[56] References Cited
UNITED STATES PATENTS

| | | | |
|---|---|---|---|
| 1,941,363 | 12/1933 | Norviel | 98/2.01 |
| 2,694,970 | 11/1954 | Schneider | 98/14 |
| 3,075,449 | 1/1963 | Clark | 98/2.01 |
| 3,121,314 | 2/1964 | Koyanagi | 62/133 |
| 3,403,855 | 10/1968 | Bouthors | 98/2.01 |

Primary Examiner—William J. Wye
Attorney, Agent, or Firm—Craig & Antonelli

[57] ABSTRACT

A heating and ventilating installation for a motor vehicle, with a blower consisting of an electric motor and a fan wheel, which can be selectively turned on and off by means of a manually actuatable switch; an additional switch is thereby provided in series with the manually actuatable switch, which at low driving velocities or during standstill of the vehicle turns off the engaged blower and with increasing velocity or when overcoming the standstill, again turns on the blower.

16 Claims, 1 Drawing Figure

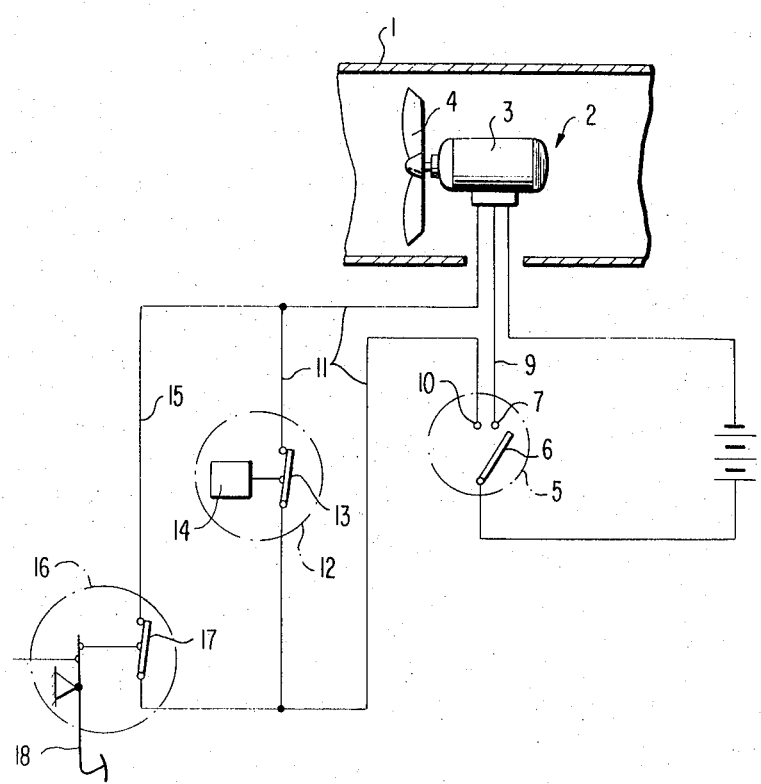

HEATING AND VENTILATING INSTALLATION FOR A MOTOR VEHICLE

The present invention relates to a heating and ventilating installation for a motor vehicle, with a blower consisting of an electric motor and of a fan wheel or rotor, which can be turned on and off by means of a manually actuated switch.

In order not to impair the comfort of the passengers of motor vehicles, the supply of fresh air into the interior space of the vehicle is necessary. Since an air quantity which is as uniform as possible is thereby desired at each driving velocity, the missing supply of fresh air produced by the dynamic air pressure at higher speeds is replaced at low driving velocities or during standstill of the motor vehicle by a supply by means of a blower. The supply of fresh air by means of a blower at slow driving speeds or during standstill of the vehicle, however, is unfortunately not without danger because under these operating conditions of the vehicle under present-day traffic conditions, namely at a slow drive or moving-up or inching up in a close line of a traffic column or during a stoppage in a traffic line, for example, in front of traffic lights, large amounts of exhaust gases are forced into the interior space of the vehicle. The consequence is a considerable reduction of the comfort of the passengers and an odor annoyance.

The present invention is concerned with the task to eliminate the described disadvantages. The underlying problems are solved according to the present invention in that in series with the switch to be manually actuated, an additional switch is provided, which at low driving velocities or during standstill of the motor vehicle, turns off the engaged blower and with increasing driving velocity or when overcoming the standstill again turns on the blower.

It is achieved by the present invention that at slow drives of the motor vehicle or during a stoppage, the blower is turned off or disengaged so that at slow drives in heavy traffic columns or lines with small distances or in case of a stoppage behind a motor vehicle, for example, in front of a traffic light, the interior space of the motor vehicle is not filled with air containing exhaust gases. As soon as a certain driving velocity and correspondingly also a sufficient spacing with respect to the preceding vehicle is then attained, the blower again turns on automatically. Consequently, no special attention is necessary in order to turn off the blower when one has to reckon with exhaust gas components in the supplied fresh air, and also not in order to turn on again the blower after the cessation of the danger.

In one advantageous embodiment of the present invention, the additional switch may consist of a centrifugal switch which is driven by a member repeating the driving velocity, or it may also consist of a standstill switch of conventional construction. Such a standstill switch is normally an electrical speed switch which exercises its function during the movement phase of the vehicle shortly prior to standstill and whose operation is based on the characteristics of oil to readily expand on metal surfaces after the wetting thereof and to oppose a certain resistance against a rapid wiping off. Since such centrifugal and standstill switches are commercially available and are known as such in the art, a detailed description thereof is dispensed with herein.

According to a further feature of the present invention, a further switch may be provided in parallel to the additional switch, which turns off the turned-on or engaged blower in dependence on a selective actuation of an actuating member present in the motor vehicle which is actuated at will during the stoppage of the motor vehicle. It is achieved thereby that a disengagement of the blower does not take place during each slow drive or during each stoppage of the vehicle, but only when it is desired, for example, while driving in heavy traffic lines or columns.

In motor vehicles which are equipped with an automatic transmission and in which it is necessary as a rule in case of a stoppage to hold the motor vehicle stationary by means of the brake, the further switch may be coupled advantageously with the foot pedal or the linkage thereof so that the running blower is turned off when the brake is actuated at slow drive or when the foot brake is actuated in case of a stoppage.

The switch to be actuated manually may have two engaging positions whereby the additional switch and the further switch may be coordinated to only one of these engaging positions. It is possible with this type of construction depending on the selection to keep the operation of the blower independent of the operating condition of the motor vehicle by the selective engagement of the blower in one of the engaging positions and to tie the operation of the blower to the vehicle operating condition by the selective engagement in the other engaging position. Furthermore, it is possible to cancel out at will the tie to the vehicle operating condition by the engagement of the other switch position.

Insofar as a manually actuatable switch is provided, by means of which at least two different rotational speed ranges for the blower can be engaged, the arrangement may be made according to a further embodiment of the present invention in such a manner that one of these rotational speed ranges, preferably an upper rotational speed range remains without influence by the additional switch and the further switch. A rotational speed range is gained thereby which is independent of the operating condition of the motor vehicle and which can be used when a tie of the blower operation to the operation of the motor vehicle is undesirable.

Accordingly, it is an object of the present invention to provide a heating and ventilating system for a motor vehicle which avoids by simple means the aforementioned shortcomings and drawbacks encountered in the prior art.

Another object of the present invention resides in a heating and ventilating installation for a motor vehicle which avoids filling the interior space of the motor vehicle with fresh air containing large amounts of exhaust gas components when driving in long traffic lines at slow speeds.

A further object of the present invention resides in a control arrangement for a heating and ventilating installation for a motor vehicle which is automatically operable in such a manner that the ventilating blower is turned off when there is a danger of a supply of outside air containing large amounts of exhaust gas components.

Still another object of the present invention resides in a heating and ventilating installation for a motor vehicle and to a control system therefor which is simple in construction and reliable in operation for the intended purposes.

A still further object of the present invention resides in a heating and ventilating installation for a motor vehicle in which the operation of the ventilating blower can be selectively tied to the operating condition of the vehicle or can be rendered independent thereof.

These and further objects, features and advantages of the present invention will become more apparent from the following description when taken in connection with the accompanying drawing which shows, for purposes of illustration only, one embodiment in accordance with the present invention, and wherein:

The single FIGURE is a schematic circuit diagram for a heating and ventilating installation for a motor vehicle in accordance with the present invention.

Referring now to the single FIGURE of the drawing, a blower generally designated by reference numeral 2 which is provided in a ventilating duct 1 of a motor vehicle for the supply of fresh air, consists of an electric motor 3 and of a fan or blower wheel 4. The blower 2 may be turned on by means of a switch 5 to be manually actuated in such a manner that in one position of the switch member 6 on the contact 7, the line 8 is connected with the line 9 and the blower 2 rotates in the upper rotational speed range, and in such a manner that in a position of the switch member 6 on the contact 10, the line 8 is connected with the line 11 and the blower 2 rotates in the lower rotational speed range.

An additional switch 12 is arranged in the line 11 in series with the switch 5, which consists of a switch member 13 and of a centrifugal switch or standstill switch 14 of conventional construction which actuates the switch member 13. A line 15 extends in parallel to the line 11, in which is provided a further switch 16. This further switch 16 includes a switching member 17 which is coupled with the foot brake pedal 18 of the motor vehicle. The switch 12 is closed when the motor vehicle moves with a driving velocity greater than a certain low driving velocity and the switch 16 is closed when the foot brake pedal 18 is not depressed. If the switching member 6 in the switch 5 is pivoted over onto the contact 10, then the blower 2 rotates in the lower rotational speed range and supplies fresh air. At very small driving velocities or at standstill of the motor vehicle, the switch 12 opens, however, the blower 2 continues to rotate if the switch 16 remains closed with a non-actuated foot brake pedal 18. By depressing the foot brake pedal 18, the switch 16 is opened and the blower 2 comes to standstill even though it is turned on or engaged by means of the manual switch 5. The entry of exhaust gases is thus prevented. By releasing the foot brake pedal 18, the blower 2 can again be turned on intentionally which is also possible in that by means of the switch 5 the switch member 6 is pivoted onto the contact 7 whereby the blower 2 then rotates in the upper rotational speed range.

In case that three rotational speed steps for the blower can be selectively engaged by means of the switch 5, it is possible to undertake the arrangement in such a manner that at a slow drive of the motor vehicle or at standstill thereof, the blower is turned off, if it rotates in the lower and in a middle rotational speed range.

Furthermore, it may be advantageous to make the construction of the switch in such a manner that the blower is turned on with a delay and is also turned off with a delay. Commercially available delay switches or delay elements of conventional type may be used for that purpose. Analogously, also a fresh air inlet flap may be closed by means of the described control arrangement and simultaneously a recirculating flap may be opened thereby. In case of the existence of an air conditioning installation, it is recommended to close only the fresh air inlet if the vehicles drives slowly or stands still.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A heating and ventilating installation for a motor vehicle which comprises a blower means including an electric motor and a fan wheel, a manually actuatable switch means for selectively turning on and off the blower means, characterized by an additional switch means in series with the manually actuatable switch means, said additional switch means being operable to turn off the engaged blower means at low driving velocities or during standstill of the motor vehicle and being operable to turn on again the blower means with increasing velocity or upon overcoming the standstill.

2. An installation according to claim 1, characterized in that the additional switch means consists of a centrifugal switch means.

3. An installation according to claim 1, characterized in that the additional switch means consists of a standstill switch means.

4. An installation according to claim 1, characterized in that a further switch means is provided in parallel to the additional switch means, said further switch means being operable to turn off the engaged blower means in dependence on a selected actuation of an actuating member carried out during stoppage of the motor vehicle.

5. An installation according to claim 4, characterized in that the further switch means is operatively connected with a foot brake means.

6. An installation according to claim 5, characterized in that the further switch means is operatively connected with a foot brake pedal of the foot brake means.

7. An installation according to claim 5, characterized in that the further switch means is operatively connected with a linkage of the foot brake pedal means.

8. An installation according to claim 5, characterized in that the manually actuatable switch means includes two engaging positions and in that the additional and further switch means are coordinated to only one of said engaging positions.

9. An installation according to claim 5, in which at least two different rotational speed ranges for the blower means are engageable by the manually actuatable switch means, characterized in that one of these rotational speed ranges remains uninfluenced by the additional switch means and by the further switch means.

10. An installation according to claim 9, characterized in that said one rotational speed range is the upper rotational speed range.

11. An installation according to claim 9, characterized in that the additional switch means consists of a centrifugal switch means.

12. An installation according to claim 1, characterized in that the additional switch means consists of a standstill switch means.

13. An installation according to claim 1, characterized in that the manually actuatable switch means includes two engaging positions and in that the additional and further switch means are coordinated to only one of said engaging positions.

14. An installation according to claim 1, in which at least two different rotational speed ranges for the blower means are engageable by the manually actuatable switch means, characterized in that one of these rotational speed ranges remains uninfluenced by the additional switch means and by the further switch means.

15. An installation according to claim 14, characterized in that a further switch means is provided in parallel to the additional switch means, said further switch means being operable to turn off the engaged blower means in dependence on a selected actuation of an actuating member carried out during stoppage of the motor vehicle.

16. An installation according to claim 13, characterized in that a further switch means is provided in parallel to the additional switch means, said further switch means being operable to turn off the engaged blower means in dependence on a selected actuation of an actuating member carried out during stoppage of the motor vehicle.

* * * * *